UNITED STATES PATENT OFFICE.

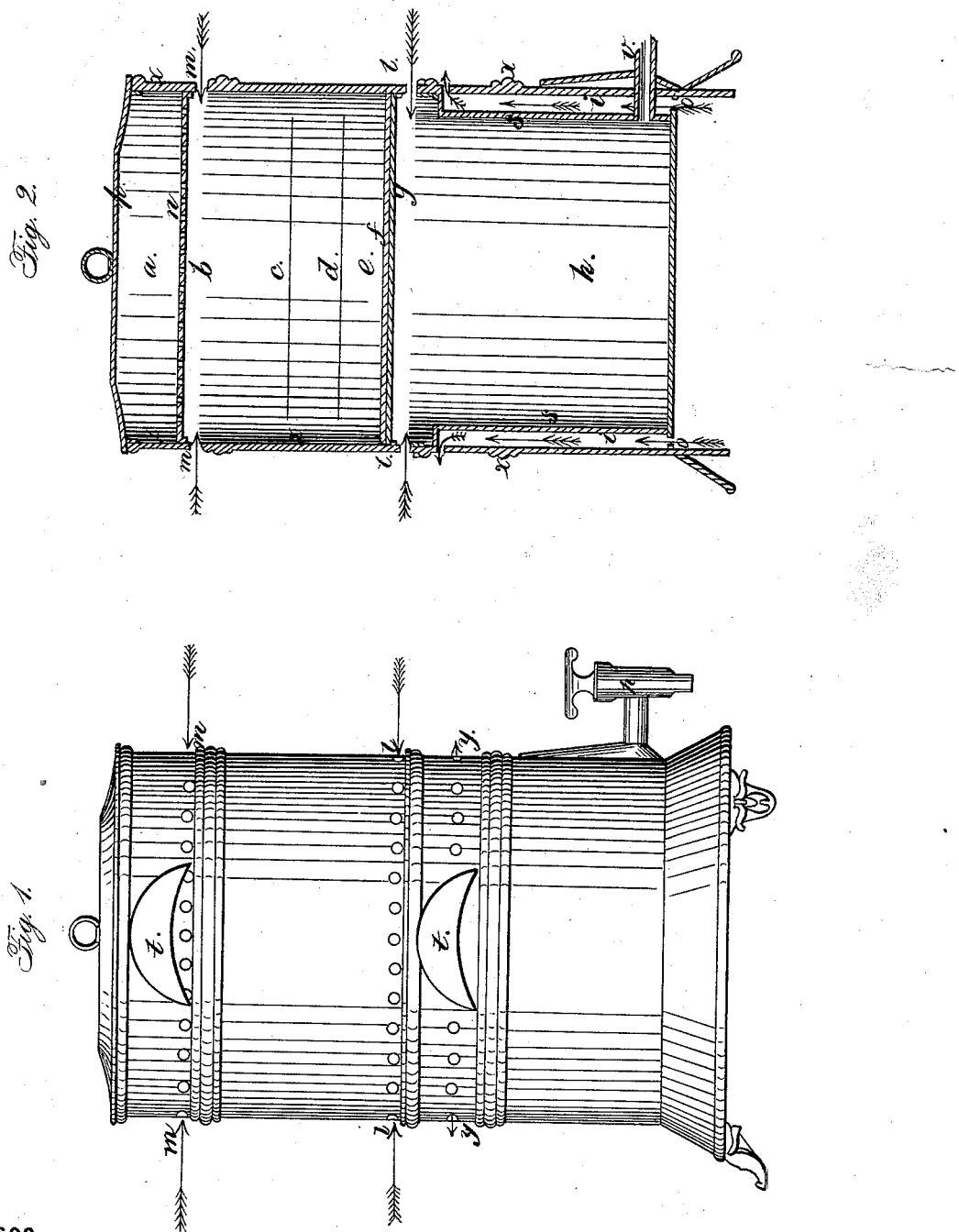

ANDREW T. DUNSHEE, OF McKEESPORT, PENNSYLVANIA.

IMPROVEMENT IN WATER-FILTERS.

Specification forming part of Letters Patent No. 33,340, dated September 24, 1861.

*To all whom it may concern:*

Be it known that I, ANDREW T. DUNSHEE, of McKeesport, in the county of Allegheny and State of Pennsylvania, have invented a certain new and useful Improvement in Water Filters and Coolers; and I do hereby declare that the following is a full and exact description thereof, reference being had to the accompanying drawings, and to the letters of reference marked thereon.

The nature of my invention consists in an arrangement of a water filter and cooler furnished with perforated bottoms, air-chamber, and air-passages, and used in combination with layers of charcoal prepared and proportioned in the manner hereinafter described.

To enable others skilled in the art to make and use my invention, I will proceed to describe its construction and operation.

In the accompanying drawings, Figure 1 is a side or face view of the water filter and cooler. Fig. 2 is is a cut or sectional view.

$x$ is the case of the filter and cooler. $n$ and $g$ are the perforated bottoms.

$f$ is a cloth, which is placed on the upper side of the perforated bottom $g$.

$m$ and $l$ are air-passages.

$p$ is the cover of the filter.

$s$ is the inside case of the water-cooler.

$i$ is the air-chamber of the water-cooler, and is furnished with openings $o$ for the ingress of cold air and openings $y$ for the egress of heated air.

$t$ are the handles of the filter and cooler.

$r$ is the water-cock of the water-cooler.

$b$ is an air-space, which is between the upper layer of charcoal and the perforated bottom $n$. The spaces $c$, $d$, and $e$ are used for the layers of charcoal. The average depth of the different layers is as follows: The lower layer, which is placed on the cloth $f$ and below the red line $d$, is four inches in depth and consists of pieces of charcoal about the size of "buckshot." The second layer, which is placed on the top of the first layer and below the line $c$, is six inches in depth, and is composed of pieces of charcoal much finer than that in the first layer. The third layer, which is placed on the top of the second layer, is two inches in depth, and is composed of very fine particles of charcoal. The upper layer will, according to its depth, regulate the speed of the filtering process. If great speed is desired in filtering, reduce its depth, and if a slow process is desired increase its depth. The depth of the upper layer must be increased or diminished in proportion to the condition of the water to be filtered. If the water is very dirty, muddy, salty, hard, or impregnated to any great extent with any earthy matter, making the water unfit for use, the depth of the upper layer must be increased. If the water is not very dirty, muddy, salty, or impregnated with deleterious matter, then the depth of the upper layer must be diminished. The charcoal should be made from beech, maple, or sugar-tree. The wood of the above-named trees is the most suitable of any known for the purpose of making charcoal, having a spongy texture and great power of absorption. The above properties in the charcoal are absolutely necessary, in connection with the preparation and proportion of the charcoal, to the perfect filtering of the water in my arrangement of the filter and water-cooler.

By duplicating the filtering arrangement any desired power of the filtering process may be obtained.

The perforations in the bottom $g$ should be twice as large as those of bottom $n$, and the perforations of the bottoms $n$ and $g$ should be arranged so as to be on a line with each other.

The filtering power of the filter is increased or diminished in proportion to the number of the openings $m$ and $l$ used. If a large number of the openings are used, the power of the filter is increased, and if a small number are used its power is diminished, and by closing up all of the openings $m$ and $l$ the process of filtering will be very slow. By the use of the openings $m$ the pressure of the atmosphere is allowed to act on the water which falls on the upper layer of charcoal, and the openings $l$ cause a suction between the upper layer of charcoal and the perforated bottom $g$. Hence by preparing and proportioning the charcoal as herein described in connection with the use of the openings $m$ and $l$ a very great filtering power is obtained.

The operation of my improvement is as follows: Having the filter and cooler arranged and combined as represented in the accompanying drawings and the layers of charcoal prepared and proportioned as hereinbefore stated, the water to be filtered is placed in the chamber $a$. It then passes through the perforated bottom $n$ and falls on the upper layer of the charcoal. The water, which falls from the perforated bottom $n$ in a great number of very small streams or drops resembling rain, is supplied with air through the openings $m$, thereby mixing or supplying the water with a fresh supply of oxygen, of which pure water contains eighty-nine per cent., which is necessary to pure water, and of which property impure water is deficient. The water after it falls on the upper layer passes through it and the other layers and through the filtering-cloth $f$ and the perforated bottom $g$ down into the chamber $h$ of the water-cooler. The filtered water as it falls from the perforated bottom $g$ is supplied with fresh air, which will impart to it another supply of oxygen. The water in chamber $h$ is kept cool by the current of air which passes into the air-chamber $i$ through the openings $o$. The light or heated air will pass from the air-chamber $i$ out through the openings $l$. The water is drawn off from the chamber $h$ by the water-cock $r$.

I am aware that charcoal by itself and in connection with other matter has been used in various ways for filtering purposes. Therefore I do not claim the use of charcoal when prepared, proportioned, and used with other matter for filtering purposes.

Having thus described the nature, construction, and operation of my improvement, what I claim as of my invention, and desire to secure by Letters Patent of the United States, is—

The perforated bottoms $n$ and $g$, filtering-cloth $f$, and openings $m$ and $l$, when used in connection with the triple strata of charcoal prepared and proportioned as herein set forth.

A. T. DUNSHEE.

Witnesses:
WM. MCINTYRE,
DAVID H. RHODES.